Dec. 5, 1944.   S. R. JORDAN   2,364,076
STRAIN GAUGE CONNECTION
Filed Aug. 14, 1943

INVENTOR
STANLEY R. JORDAN

Patented Dec. 5, 1944

2,364,076

UNITED STATES PATENT OFFICE 2,364,076

STRAIN GAUGE CONNECTION

Stanley R. Jordan, Dayton, Ohio

Application August 14, 1943, Serial No. 498,644

2 Claims. (Cl. 201—63)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to wire strain gauges and the art of making the same, and aims to provide an improved connection between the wire gauge element and the terminal leads, so that said connections are not subjected to the strain imposed on the gauge element in the direction of measurement.

Wire strain gauges such as the one shown in Fig. 4 of the Simmons Patent No. 2,292,549, dated August 11, 1942, are used to measure surface strains in engineering materials. Heretofore, the gauge wire and terminals have been soldered together to make a good mechanical and electrical connection. The gauge wire in general extends parallel to the direction on which the strain is measured. When large stresses are applied, particularly if many times repeated, the terminals become loosened from the gauge wire in spite of the solder, and the readings then are unreliable and must be taken again after repairs or replacements have been made.

In the accompanying drawing—

Figure 1:
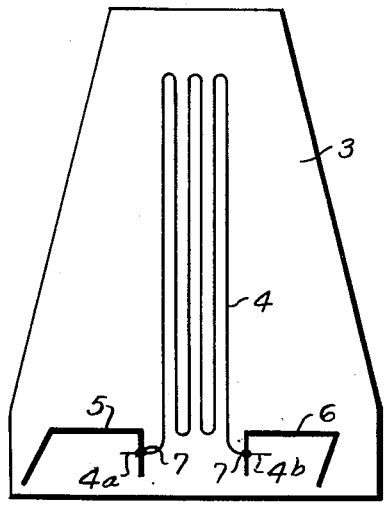
Figure 2:
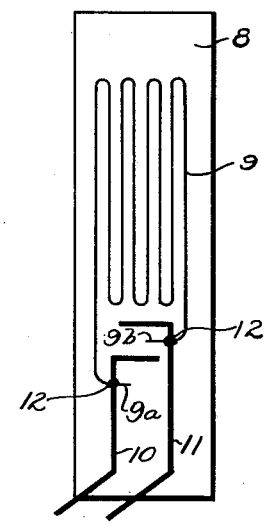

Fig. 1 is a plan view on the enlarged scale of a strain gauge made in accordance with the invention; and Fig. 2 is a similar view of a slightly different form of strain gauge.

Referring particularly to the drawing, the strain gauge of Fig. 1 comprises a support which is usually a sheet of paper 3 to which the looped wire element or filament 4 of the strain gauge is secued by cement (not shown because of the difficulties involved in illustration). The wire or filament 4 is an extensible and contractible member whose resistance varies proportionately to the extension and contraction to which it is subjected by the test specimen. The two ends 4a, 4b of the wire element are not left parallel to the major length or longitudinal axis of the strain gauge, as is customary, but are turned at right angles as shown, and the terminal leads 5, 6, are secured by solder 7 directly to the outturned ends 4a, 4b, respectively. The form of Fig. 2 is exactly the same except that the sheet of paper 8 is of a different shape and the wire element 9 comprises more loops, and has inturned ends 9a, 9b, to which leads 10, 11, are secured by solder 12. The outturned ends 4a, 4b, and the inturned ends 9a, 9b, are each of a short length and are glued or cemented to the paper sheet or to the test object. Also the adjacent portions of the leads are cemented or otherwise bonded to the support.

In both forms of the invention any stress imposed on the wire gauge element is not effective to loosen or break the soldered connection because the ends of the wire element lie in a direction at right angles to the direction of the strain. The invention is applicable equally well to wire strain gauges formed of elements cemented directly to the surface of the material whose strain is to be measured, or of elements cemented to thin paper or the like (as illustrated), or of elements molded into the material.

I am aware that it has been proposed to construct condensers in such a way that the lead wires will withstand considerable longitudinal stresses without tearing loose from the condensers or otherwise impairing the union therewith. An example is the Burlingame Patent No. 2,011,555, dated August 13, 1935, showing lead wires with loops located adjacent their ends (which are soldered to the metallic foil strips of the condenser), said loops providing lengths of wire which will yield to a pull on the wire, without transmitting the stress direct to the soldered connections. However, this construction is fundamentally different from my invention in several particulars and need not be further discussed.

The described connection may outlast the test specimen, even if of steel or other metals. It is known that when steel or the like is subjected to a stress in one direction, the major strain which is in the same direction is accompanied by a smaller strain at right angles. It is only this smaller strain which is imposed on the described connection, the result being that the connection has a long life.

What I claim is:

1. In the art of making electrical strain gauges comprising a continuous solid filament of extensible and contractible electrical conducting material whose resistance varies proportionately to said extension and contraction, and a support for said filament adhesively bonded to said filament throughout its effective length, whereby deformations of a stressed body to which the support is attached are transmitted through the support to the filament, that improvement which consists in bending the two ends of the filament either inwardly or outwardly substantially at right angles to the longitudinal axis of the strain gauge and cementing said bent ends to the support, and electrically bonding two leads to the bent ends and also cementing those portions of the leads which are adjacent the bonds to the support.

2. In an electrical strain gauge for measuring changes in the deformation of a test object as it is variably strained, comprising a continuous and untaut metallic filament of solid electrical conducting material whose electrical resistance varies in accordance with changes in strain in the filament, and means for adhesively bonding said filament in its untaut condition throughout its effective length to said object so that said filament forms effectively a unitary part of said object, that improvement which consists in the provision of bent ends on the filament which lie at right angles to the direction in which the filament is extended and contracted during a test of the test object, leads electrically connected to said right angularly bent ends, and means adhesively bonding the leads, the bent ends and the electrical connections between them to the object.

STANLEY R. JORDAN.